Patented Mar. 31, 1936

2,035,899

UNITED STATES PATENT OFFICE 2,035,899

COMMINUTED SHORTENING

George Howard Kraft, Chicago, Ill., assignor to Kraft-Phenix Cheese Corporation, Chicago, Ill., a corporation of Delaware No Drawing. Application May 5, 1934, Serial No. 724,205. Renewed August 16, 1935

6 Claims. (Cl. 99—13)

My invention relates to a new and improved comminuted shortening and may be considered an improvement over the invention described and claimed in Edward K. Chapin Patent No. 1,928,781, dated October 3, 1933.

Said Chapin invention relates to a dry comminuted shortening containing at least about 50 per cent fat, and comprising minute globules of fat each enclosed in an envelope of casein, the casein having substantially the same chemical properties as the casein of normal milk but of improved film-forming properties, said casein serving to protect the fat from deteriorating agencies, while being readily dispersible so that the fat may be quickly released upon the addition of water to the material. Said shortening is made by emulsifying a heated mixture of fat and milk and then atomizing the emulsified mixture, as by spray drying, so as quickly to remove the moisture.

I have discovered that if whey solids be used as the fat-enveloping medium, a dry comminuted shortening may be produced which in many respects is superior to the Chapin shortening containing total milk solids as the fat-enveloping medium. Whey solids are quite different from skim milk solids. A major ingredient present in skim milk is casein, which constitutes about 35 percent of skim milk solids. This substance is not present at all in whey. Sweet whey solids contain only about 11–12 per cent of protein, and this is in the form of the completely soluble lactalbumin, while the major ingredient is lactose, which is highly soluble and constitutes about 70 to 75 per cent of the whey solids. The remaining solids are made up of soluble inorganic salts.

It is apparent, therefore, that all of the whey solids are highly soluble in water. Hence, a shortening material consisting of minute fat particles each encased in an envelope of whey solids, provided said solids have not been abused in the drying process, releases its fat content almost instantly upon the addition of water. This is a very important fact since the more completely the fat content is released the greater will be the shortening action in baked products.

Shortening material made in accordance with my invention may contain any desired proportion of fat and is usually made so as to contain from 70 to 80 per cent, although the material may be produced so as to contain as much as 90 per cent of fat. Fifty per cent is usually the minimum desired.

A wide variety of fats may be used in practicing my invention. Fats which I have found satisfactory in the making of a shortening especially suitable for prepared biscuit flour and doughnut flour are partially hydrogenated vegetable oils such as sesame and cotton seed. Various other edible oils and fats, having shortening properties, may be used, such as cottonseed oil, coconut oil, peanut oil, hydrogenated peanut oil, corn oil, hydrogenated corn oil, lard, hydrogenated lard, coconut butter, etc.

Example

In accordance with a preferred example of my invention, I use 700 pounds of partially hydrogenated vegetable oil as described above and heat it sufficiently to liquefy the same. Enough liquid whey to contain 300 pounds of whey solids is mixed with the liquefied hydrogenated vegetable oil and the mixture is run through a homogenizer of any suitable type, preferably under a pressure of about 2500 pounds per square inch, so as to obtain a thorough emulsification of the fat and aqueous material. The emulsified material is then simultaneously atomized and dried in any suitable type of spray-drying equipment, preferably a Gray and Jensen drier. The liquid is preferably kept warm and under agitation until sprayed.

There is produced by the above-described process a dry, comminuted, siftable shortening comprising minute fat particles substantially completely encased in highly soluble envelopes of whey solids, inasmuch as the solubility of said solids has not been impaired by the drying process. Hence, upon the addition of moisture (water or milk) to the dry shortening, the fat is released almost instantly, so that it may function in a shortening capacity. The whey solids, consisting of lactose, lactalbumin, and the inorganic salts of milk, are of high value in any baking or prepared flour formula.

For purposes of standardization, it is desirable that the whey used in accordance with my invention should have not more than about 0.14 to 0.15 of one per cent of acid. However, I do not consider my invention as limited to the use of whey of this character. It is merely considered desirable for the reason that, in dispensing the shortening material to bakers, prepared flour manufacturers and others, they may thus use it with the assurance that it is of a fixed or standard acidity. Other acidities may be used.

The improved material described above may be used in substantially the same manner as the Chapin product; that is to say, it may be poured or sifted into the flour and other baking ingredients used in the manufacture of prepared flours such as doughnut, biscuit, cake, waffle, pancake or other prepared flour products and bakery products, and will readily become mixed or commingled with the dry ingredients without the necessity of prolonged working or agitation as is required with the usual shortening materials, the fat content being disseminated throughout the mix instantly on the addition of water or milk. As stated above, my improved product has the advantage of releasing its fat content considerably more quickly than the Chapin product.

The word "fat" as used in the claims is intended to include both liquid and solid fats.

The material prepared as described above may be packed without special air-excluding precautions and will keep for substantial periods of time without deterioration both as to fat content and agglomeration. It is preferred, however, that the material be packed in cartons having an inner lining of waxed paper or the like when the product is likely to be subjected for a substantial length of time to humid atmospheric conditions, in view of the high solubility of the whey solids.

I claim as my invention:

1. An improved dry, comminuted, siftable shortening, comprising minute particles of an edible shortening fat encased in envelopes of whey solids, said envelopes being highly soluble whereby said fat may be quickly released, and the fat constituting at least 50 per cent of said shortening.

2. An improved dry, comminuted siftable oleoferous powder, comprising minute particles of an edible partially hydrogenated vegetable oil having shortening properties encased in envelopes of whey solids, said envelopes being highly soluble whereby said fat may be quickly released, and the fat constituting at least 50 percent of said shortening.

3. An improved dry, comminuted, siftable oleoferous powder, comprising minute particles of cottonseed oil encased in envelopes of whey solids, said envelopes being highly soluble whereby said fat may be quickly released, and said fat constituting at least about 50 per cent of said shortening.

4. An oleoferous powder capable of releasing its fat content upon the addition of an aqueous liquid, comprising minute particles of an edible fat encased in envelopes of whey solids, said envelopes being highly soluble, whereby said fat may be quickly released, and the fat constituting approximately 50 per cent or more of said powder.

5. An oleoferous powder capable of releasing its fat content upon the addition of an aqueous liquid, comprising minute particles of hydrogenated cottonseed oil encased in envelopes of whey solids, said envelopes being highly soluble, whereby said fat may be quickly released, and the fat constituting approximately 50 per cent or more of said powder.

6. An oleoferous powder capable of releasing its fat content upon the addition of an aqueous liquid, comprising minute particles of hydrogenated sesame oil encased in envelopes of whey solids, said envelopes being highly soluble, whereby said fat may be quickly released, and the fat constituting approximately 50 per cent or more of said powder.

GEORGE HOWARD KRAFT.